(12) United States Patent
Park et al.

(10) Patent No.: US 10,608,247 B2
(45) Date of Patent: Mar. 31, 2020

(54) NEGATIVE ELECTRODE FOR SECONDARY BATTERY, METHOD OF FABRICATING THE SAME AND SECONDARY BATTERY INCLUDING THE SAME

(71) Applicant: LG Chem, Ltd., Seoul (KR)

(72) Inventors: Jun Soo Park, Daejeon (KR); Ji Hee Yoon, Daejeon (KR); Je Young Kim, Daejeon (KR); Jung Woo Yoo, Daejeon (KR)

(73) Assignee: LG Chem, Ltd. (KR)

( * ) Notice: Subject to any disclaimer, the term of this patent is extended or adjusted under 35 U.S.C. 154(b) by 69 days.

(21) Appl. No.: 15/746,992

(22) PCT Filed: Mar. 29, 2017

(86) PCT No.: PCT/KR2017/003444
§ 371 (c)(1),
(2) Date: Jan. 23, 2018

(87) PCT Pub. No.: WO2017/171409
PCT Pub. Date: Oct. 5, 2017

(65) Prior Publication Data
US 2018/0219217 A1    Aug. 2, 2018

(30) Foreign Application Priority Data
Mar. 29, 2016 (KR) .................. 10-2016-0037713

(51) Int. Cl.
*H01M 4/36* (2006.01)
*H01M 4/62* (2006.01)
(Continued)

(52) U.S. Cl.
CPC ............ *H01M 4/366* (2013.01); *H01M 4/13* (2013.01); *H01M 4/133* (2013.01); *H01M 4/139* (2013.01);
(Continued)

(58) Field of Classification Search
CPC ........ H01M 4/13; H01M 4/133; H01M 4/139; H01M 4/366; H01M 4/587; H01M 4/622
See application file for complete search history.

(56) References Cited

U.S. PATENT DOCUMENTS

2009/0301866 A1* 12/2009 Zaghib ................ H01M 4/0404
204/242
2012/0009483 A1* 1/2012 Chu ........................ C01B 25/37
429/320

(Continued)

FOREIGN PATENT DOCUMENTS

KR        100451436 B1    10/2004
KR        101214727 B1    12/2012
(Continued)

OTHER PUBLICATIONS

Search report from International Application No. PCT/KR2017/003444, dated Jul. 7, 2017.

*Primary Examiner* — Osei K Amponsah
(74) *Attorney, Agent, or Firm* — Lerner, David, Littenberg, Krumholz & Mentlik, LLP

(57) ABSTRACT

The present invention provides a negative electrode for a secondary battery, the negative electrode including a negative electrode current collector, a first negative electrode active material layer located on the negative electrode current collector, and a second negative electrode active material layer located on the first negative electrode active material layer, such that resistance in the electrode is decreased due to an increase in adhesion between the negative electrode current collector and the active material and cohesion between the active materials, thereby significantly improving capacity and lifespan characteristics of a battery, a method of fabricating the same, and a secondary battery including the same.

13 Claims, 1 Drawing Sheet

(51) Int. Cl.
  *H01M 4/587*   (2010.01)
  *H01M 4/139*   (2010.01)
  *H01M 10/0525*   (2010.01)
  *H01M 4/13*   (2010.01)
  *H01M 4/133*   (2010.01)
  *H01M 4/02*   (2006.01)

(52) U.S. Cl.
  CPC ........... *H01M 4/587* (2013.01); *H01M 4/622* (2013.01); *H01M 10/0525* (2013.01); *H01M 2004/021* (2013.01); *H01M 2004/027* (2013.01); *H01M 2220/30* (2013.01); *Y02E 60/122* (2013.01); *Y02T 10/7011* (2013.01)

(56) References Cited

U.S. PATENT DOCUMENTS

| | | |
|---|---|---|
| 2013/0170100 A1 | 7/2013 | Lee et al. |
| 2016/0233512 A1 | 8/2016 | Park et al. |

FOREIGN PATENT DOCUMENTS

| | | |
|---|---|---|
| KR | 20140087769 A | 7/2014 |
| KR | 20140137660 A | 12/2014 |
| KR | 20150028663 A | 3/2015 |
| KR | 20150071453 A | 6/2015 |
| KR | 20160032877 A | 3/2016 |
| WO | 2015026102 A1 | 2/2015 |

\* cited by examiner

[FIG. 1]
100
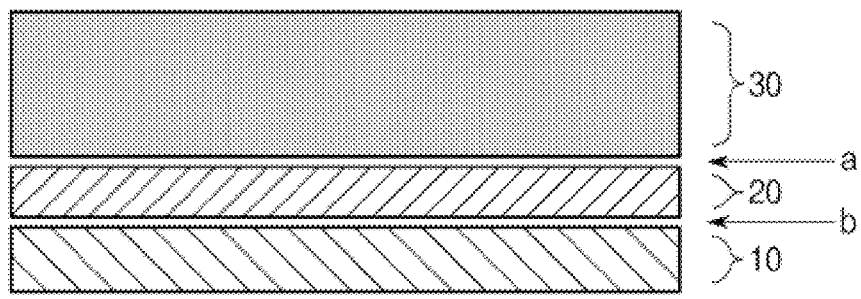

NEGATIVE ELECTRODE FOR SECONDARY BATTERY, METHOD OF FABRICATING THE SAME AND SECONDARY BATTERY INCLUDING THE SAME

CROSS-REFERENCE TO RELATED APPLICATION

This application is a national phase entry under 35 U.S.C. § 371 of International Application No. PCT/KR2017/003444, filed Mar. 29, 2017 which claims priority to Korean Patent Application No. 10-2016-0037713, filed on Mar. 29, 2016, the disclosures of which are incorporated herein by reference.

TECHNICAL FIELD

The present invention relates to a negative electrode for a secondary battery capable of significantly improving capacity and lifespan characteristics of a battery by a decrease in resistance in the electrode due to an increase in adhesion between a negative electrode current collector and an active material and cohesion between active materials, a method of fabricating the same, and a secondary battery including the same.

BACKGROUND ART

As technology development and demand for mobile devices increase, demand for secondary batteries as energy sources is sharply increasing, and among the secondary batteries, a lithium secondary battery that has high energy density and voltage is commercialized.

Polyvinylidene fluoride (PVDF), which is currently being widely used as a binder of positive and negative electrodes, is a polymer resin dissolved in an organic solvent such as N-methyl-2-pyrrolidone (NMP). Although PVDF is not an adhesive originally, PVDF is widely used as a binder of an electrode active material because PVDF has good miscibility with a graphite material, and an electrode plate having high adhesion can be fabricated by adding PVDF at an amount of about 8 to 10% of graphite.

However, because PVDF covers an active material in a state in which, for example, polymer fibers are filled, PVDF deteriorates battery performance inherent in an electrode active material in terms of capacity and efficiency. Also, because PVDF has insufficient flexibility, a bond tends to be broken and a cycle characteristic is likely to be deteriorated when a material having a large specific surface area and high expansion/contraction rate during charging and discharging such as natural graphite or a metal-based active material is used as an electrode active material.

Because PVDF, which is an existing solvent-based binder, causes the above problems, the use of styrene-butadiene-based rubber (SBR) has been recently studied, and the SBR is currently being commercially used in various ways.

However, although the SBR binder has advantages of being environmentally friendly and capable of increasing battery capacity, the SBR binder is not that effective in terms of adhesion itself despite an improvement in adhesion durability due to elasticity of a rubber. Particularly, although reducing a use amount of a binder is required to satisfy high capacity and high output of a secondary battery, there is a limitation in reducing the use amount with a current adhesion level of the SBR binder. For example, when a content of the binder in an electrode is insufficient, adhesion with a negative electrode current collector may be reduced, and thus a probability that cutting or deintercalation of the electrode may occur during charging and discharging in a secondary battery may increase. Also, because adhesion between a negative electrode current collector and an active material may be lowered than cohesion between active materials due to migration of the SBR binder during fabrication of a negative electrode, SBR should be used at an amount larger than an actually required amount to secure minimum adhesion between the negative electrode current collector and the active material.

Consequently, there is a growing need for development of a negative electrode in which resistance in the electrode is decreased due to an increase in adhesion between a negative electrode current collector and an active material and cohesion between active materials while a content of the SBR binder is reduced, thereby being capable of improving the performance of a secondary battery.

DISCLOSURE

Technical Problem

A first technical object of the present invention is to provide a negative electrode for a secondary battery in which adhesion between a negative electrode current collector and an active material and cohesion between active materials are improved even when a content of a binder is decreased and thus resistance in the electrode is decreased, thereby being capable of significantly improving capacity and lifespan characteristics of a battery.

A second technical object of the present invention is to provide a method of fabricating the negative electrode.

A third technical object of the present invention is to provide a lithium secondary battery including the negative electrode.

Technical Solution

To achieve the above objects, according to an embodiment of the present invention, there is provided a negative electrode for a secondary battery, the negative electrode including a negative electrode current collector, a first negative electrode active material layer located on the negative electrode current collector, and a second negative electrode active material layer located on the first negative electrode active material layer, wherein a ratio of a thickness of the first negative electrode active material layer to a total thickness of the first and second negative electrode active material layers is less than 0.5, the first negative electrode active material layer includes a styrene-butadiene-based rubber in which a total content of a repeating unit of a styrene-derived structure and a repeating unit of a butadiene-derived structure is 50 wt % or higher, and the second negative electrode active material layer includes a (meth)acrylate-based polymer including a repeating unit of a styrene-derived structure and a repeating unit of a (meth)acrylic acid ester-derived structure, the repeating unit of the (meth)acrylic acid ester-derived structure being included in an amount of 60 wt % to 90 wt %.

According to another embodiment of the present invention, there is provided a method of fabricating the above-described negative electrode, the method including a step of forming a first negative electrode active material layer by applying a composition for forming the first negative electrode active material layer including a styrene-butadiene-based rubber on a negative electrode current collector, and a step of forming a second negative electrode active material layer by applying a composition for forming the second negative electrode active material layer including a (meth) acrylate-based polymer on the first negative electrode active material layer, wherein a ratio of a thickness of the first negative electrode active material layer to a total thickness of the first and second negative electrode active material layers is less than 0.5, a total content of a repeating unit of a styrene-derived structure and a repeating unit of a butadiene-derived structure in the styrene-butadiene-based rubber is 50 wt % or higher with respect to a total weight of the styrene-butadiene-based rubber, and the (meth)acrylate-based polymer includes a repeating unit of a styrene-derived structure and a repeating unit of a (meth)acrylic acid ester-derived structure, the repeating unit of the (meth)acrylic acid ester-derived structure being included in an amount of 60 wt % to 90 wt %.

Other details of the embodiments of the present invention are included in the detailed description below.

Advantageous Effects

A negative electrode according to the present invention can significantly improve capacity and lifespan characteristics of a battery because adhesion between a negative electrode current collector and an active material and cohesion between active materials are improved even when a content of a binder is decreased and thus resistance in the electrode is decreased.

DESCRIPTION OF DRAWINGS

Because the following drawings attached to the present specification illustrate exemplary embodiments of the present invention and serve to facilitate understanding of the technical idea of the present invention together with the above-described content of the invention, the present invention should not be limitedly interpreted on the basis of the drawings.

FIG. 1 is a cross-sectional structural diagram schematically illustrating a negative electrode according to an embodiment of the present invention.

BEST MODE

Hereinafter, the present invention will be described in more detail to assist understanding of the present invention.

Terms or words used in the present specification and claims are not to be limitedly interpreted as general or dictionary meanings and should be interpreted as meanings and concepts that are consistent with the technical idea of the present invention on the basis of the principle that an inventor may properly define concepts of terms to describe his or her invention in the best way.

Although an adhesion characteristic capable of simultaneously providing adhesion between a negative electrode current collector and an active material and cohesion between active materials is generally required for a binder used in fabricating a negative electrode, characteristics required for the binder may vary in accordance with a position of the binder in a negative electrode when fabricating the negative electrode. Specifically, an adhesion characteristic capable of increasing adhesion between a negative electrode current collector and an active material is required in the vicinity of a contact interface between the negative electrode current collector and a negative electrode active material layer, and an adhesion characteristic capable of increasing cohesion between active materials other than the adhesion between the negative electrode current collector and the active material and a low resistance characteristic are required toward the vicinity of a contact interface between the negative electrode active material layer and an electrolyte.

Regarding this, in the present invention, by taking into consideration characteristics required for a binder in accordance with a position of the binder in a negative electrode and using two types of binders having characteristics optimized therefor, adhesion between a negative electrode current collector and an active material and cohesion between active materials may be increased even when contents of the binders are reduced. Further, by using a binder with low resistance at a contact interface side with an electrolyte, resistance in an electrode may be decreased. As a result, capacity and lifespan characteristics may be significantly improved when the negative electrode is applied to a battery.

That is, according to an embodiment of the present invention, a negative electrode includes a negative electrode current collector, a first negative electrode active material layer located on the negative electrode current collector, and a second negative electrode active material layer located on the first negative electrode active material layer, wherein a ratio of a thickness of the first negative electrode active material layer to a total thickness of the first and second negative electrode active material layers is less than 0.5, the first negative electrode active material layer includes a styrene-butadiene-based rubber in which a total content of a repeating unit of a styrene-derived structure and a repeating unit of a butadiene-derived structure is 50 wt % or higher, and the second negative electrode active material layer includes a (meth)acrylate-based polymer including a repeating unit of a styrene-derived structure and a repeating unit of a (meth)acrylic acid ester-derived structure, the repeating unit of the (meth)acrylic acid ester-derived structure being included in an amount of 60 wt % to 90 wt %.

FIG. 1 is a cross-sectional structural diagram schematically illustrating a negative electrode according to an embodiment of the present invention. FIG. 1 is merely an example for describing the present invention, and the present invention is not limited thereto.

Specifically, with reference to FIG. 1, according to an embodiment of the present invention, a negative electrode 100 may include a negative electrode current collector 10, a first negative electrode active material layer 20 formed on the negative electrode current collector and including a styrene-butadiene-based rubber, a first negative electrode active material, and selectively, a first conductive material, and a second negative electrode active material layer 30 formed on the first negative electrode active material layer 20 and including a (meth)acrylate-based polymer, a second negative electrode active material, and selectively, a second conductive material.

According to an embodiment of the present invention, by the first negative electrode active material layer including the styrene-butadiene-based rubber with excellent adhesion being located on the negative electrode current collector, the negative electrode 100 may secure excellent adhesion (b) between the negative electrode current collector and the active material first. Also, by the second negative electrode active material layer including the (meth)acrylate-based polymer with a particularly excellent resistance characteristic as well as adhesion characteristic being located on the first negative electrode active material layer, cohesion (a) between active materials at an interface between the first negative electrode active material layer and the second negative electrode active material layer as well as cohesion between active materials in the second negative electrode active material layer may be improved, and resistance in the electrode may be decreased.

Specifically, in the negative electrode according to an embodiment of the present invention, the styrene-butadiene-based rubber included in the first negative electrode active material layer located on the negative electrode current collector is an elastomer including a repeating unit of a styrene-derived structure and a repeating unit of a butadiene-derived structure. More specifically, in the styrene-butadiene-based rubber, a total content of the repeating unit of the styrene-derived structure and the repeating unit of the butadiene-derived structure with respect to a total weight of the styrene-butadiene-based rubber may be 50 wt % or higher. When the total content of the repeating units of the styrene-derived structure and the butadiene-derived structure is less than 50 wt %, the effect of improving adhesion between the negative electrode current collector and the negative electrode active material may be insignificant. More specifically, in the styrene-butadiene-based rubber, the total content of the repeating unit of the styrene-derived structure and the repeating unit of the butadiene-derived structure may be 60 wt % or higher, more specifically, 90 wt % or higher or 94 wt % or higher, with respect to the total weight of the styrene-butadiene-based rubber.

Under a condition in which the range of the total content of the repeating unit of the styrene-derived structure and the repeating unit of the butadiene-derived structure is satisfied, the repeating unit of the styrene-derived structure and the repeating unit of the butadiene-derived structure may be included in a weight ratio of 1:1 to 3:1, specifically, 1:1 to 2.5:1, in the styrene-butadiene-based rubber (SBR). By including the repeating unit of the styrene-derived structure and the repeating unit of the butadiene-derived structure within the above weight ratio range, adhesion between the negative electrode current collector and the negative electrode active material may be maximally improved. When a proportion of the repeating unit of the styrene-derived structure exceeds the above range and is included at an excess amount in the SBR, there is a concern about deterioration of flexibility of the SBR due to a hard block and breakage of an electrode. When a proportion of the repeating unit of the butadiene-derived structure exceeds the above range and is included at an excess amount, a roll may be easily contaminated during rolling of the electrode due to a glass transition temperature Tg of the SBR being lowered such that there may be difficulty in producing the electrode.

In the styrene-butadiene-based rubber, the repeating unit of the butadiene-derived structure may be a repeating unit of a structure derived from, specifically, 1,3-butadienes such as 1,3-butadiene, isoprene, 2,3-dimethyl-1,3-butadiene, and 2-ethyl-1,3-butadiene or derivatives thereof.

Also, the repeating unit of the styrene-derived structure may be a repeating unit of a structure derived from styrenes, which are aromatic vinyl-based compounds, such as styrene, α-methylstyrene, p-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexyl naphthalene or derivatives thereof.

According to an embodiment of the present invention, in addition to the above-mentioned repeating unit of the styrene-derived structure and repeating unit of the butadiene-derived structure, the styrene-butadiene-based rubber included in the first negative electrode active material layer may further include a repeating unit of a (meth)acrylic acid ester-derived structure as a repeating unit of a structure forming a central frame.

Specifically, the repeating unit of the (meth)acrylic acid ester-derived structure may be included in an amount of 30 wt % or less, more specifically, 10 wt % or less, and even more specifically, 6 wt % or less in the styrene-butadiene-based rubber with respect to a total weight of the styrene-butadiene-based rubber. In this way, when the styrene-butadiene-based rubber in the first negative electrode active material layer further includes the repeating unit of the (meth)acrylic acid ester-derived structure, resistance of the styrene-butadiene-based rubber may be decreased due to excellent conductivity of the (meth)acrylic acid ester itself, and thus resistance in the first negative electrode active material layer may be lowered. However, when the content of the repeating unit of the (meth)acrylic acid ester-derived structure included in the styrene-butadiene-based rubber exceeds 30 wt %, a content of the repeating unit of the butadiene-derived structure that provides an excellent adhesion characteristic is relatively decreased, and there is a concern about deterioration of adhesion between the negative electrode current collector and the negative electrode active material.

The repeating unit of the (meth)acrylic acid ester-derived structure may be a repeating unit of a structure derived from, specifically, (meth)acrylic acid ester-based compounds such as ethyl acrylate, butyl acrylate, 2-ethylhexyl acrylate, ethyl methacrylate, butyl methacrylate, hexyl methacrylate, and 2-ethylhexyl methacrylate.

The styrene-butadiene-based rubber having the above constitution may be used in the form of a particle. Conventionally, a binder was used by being dissolved in a solvent when fabricating a negative electrode. However, in this case, there was a problem in that the binder surrounds a surface of a negative electrode active material and thus interferes with contact between the negative electrode active material and an electrolyte. Regarding this, in the present invention, a colloidal aqueous solution is produced using the styrene-butadiene-based rubber in the form of a particle and then used such that cohesion between active materials may be exhibited while the possibility of contact between the negative electrode active material and the electrolyte is increased by allowing point contact with the negative electrode active material.

Specifically, the styrene-butadiene-based rubber may have an average particle size ($D_{50}$) that is 0.001 to 0.2 times an average particle size ($D_{50}$) of the first negative electrode active material. When a ratio of the average particle size ($D_{50}$) of the styrene-butadiene-based rubber to the average particle size ($D_{50}$) of the first negative electrode active material is less than 0.001, there is a concern that the styrene-butadiene-based rubber in the form of a fine particle may surround a surface of the first negative electrode active material and interfere with contact between the active material and the electrolyte, and when the average particle size ($D_{50}$) of the styrene-butadiene-based rubber exceeds 0.2 times the average particle size ($D_{50}$) of the first negative electrode active material, a point contact ratio with the active material is decreased, and it is difficult to provide excellent adhesion. More specifically, the styrene-butadiene-based rubber may have an average particle size ($D_{50}$) of 50 nm to 800 nm.

When the average particle size ($D_{50}$) of the styrene-butadiene-based rubber exceeds the above range, a problem may occur in terms of a process and adhesion due to a large particle size, and when the average particle size ($D_{50}$) of the styrene-butadiene-based rubber is less than the above range, dispersibility is deteriorated due to condensation between fine particles, uniform dispersion of the particles in the first negative electrode active material layer may be difficult, and there is a concern about deterioration of the adhesion characteristic. More specifically, the average particle size ($D_{50}$) of the styrene-butadiene-based rubber may be 50 nm to 700 nm, and more specifically, 90 nm to 600 nm.

In the present invention, the average particle size ($D_{50}$) may be defined as a particle size based on a particle size distribution at 50%. An average particle size ($D_{50}$) of a styrene-butadiene-based rubber particle may be measured using, for example, a laser diffraction method. More specifically, the styrene-butadiene-based rubber particle may be dispersed in a solvent, the dispersed particle may be introduced into a commercially available laser diffraction particle size measurement device (for example, Microtrac MT 3000), and then an ultrasonic wave of about 28 kHz may be radiated with an output of 60 W to calculate the average particle size ($D_{50}$) based on a particle size distribution at 50% in the measurement device.

The styrene-butadiene-based rubber in the first negative electrode active material layer may be included in an amount of 1 wt % to 20 wt % with respect to a total weight of the first negative electrode active material layer. By the butadiene-based rubber being included in the first negative electrode active material layer at an amount of the above range, a binding force between the first negative electrode active material layer and the negative electrode current collector may be excellent, and electrical conductivity, energy density, and the like of an electrode plate may be improved. In consideration of the remarkableness of the effect of improving the binding force and improving electrical conductivity and energy density in the negative electrode in accordance with the inclusion of the styrene-butadiene-based rubber in the first negative electrode active material layer, the styrene-butadiene-based rubber may be included at an amount of, more specifically, 1 wt % to 10 wt %, and even more specifically, 1 wt % to 5 wt %, with respect to the total weight of the first negative electrode active material layer.

According to an embodiment of the present invention, in addition to the butadiene-based rubber, the first negative electrode active material layer may selectively further include the first conductive material as well as the first negative electrode active material generally include in the negative electrode active material layer.

A compound capable of reversible intercalation and deintercalation of lithium may be used as the first negative electrode active material. Specific examples thereof include a carbonaceous material such as artificial graphite, natural graphite, graphitized carbon fiber, and amorphous carbon; a metallic compound capable of being formed into an alloy with lithium, such as Si, Al, Sn, Pb, Zn, Bi, In, Mg, Ga, Cd, an Si-alloy, an Sn-alloy, and an Al-alloy; a metal oxide capable of doping and dedoping lithium, such as $SiO_x$ (0<x<2), $SnO_2$, vanadium oxide, and lithium vanadium oxide; an a composite including the metallic compound and the carbonaceous material, such as an Si—C composite or an Sn—C composite, and any one or a mixture of two or more selected therefrom may be used as the first negative electrode active material.

Among these, the first negative electrode active material may be the carbonaceous material, and specifically, both low crystalline carbon and high crystalline carbon may be used. Soft carbon and hard carbon are typical low crystalline carbon, and high-temperature sintered carbons such as amorphous, plate-shaped, flake-shaped, spherical, or fiber type natural graphite or artificial graphite, Kish graphite, pyrolytic carbon, mesophase pitch based carbon fiber, meso-carbon microbeads, mesophase pitches, and petroleum or coal tar pitch derived cokes are typical high crystalline carbon. More specifically, the first negative electrode active material may be a graphite material such as natural graphite with relatively high resistance, more specifically, a mixture of natural graphite and artificial graphite, and even more specifically, the first negative electrode active material may be a mixture in which natural graphite and artificial graphite are mixed in a weight ratio of 9:1 to 1:9 a weight ratio of 6:4 to 4:6, or a weight ratio of 5:5.

The first conductive material is used to impart conductivity to an electrode, and any conductive material can be used as the first conductive material without particular limitation as long as the conductive material does not cause a side reaction with other components of a secondary battery and has conductivity. Specific examples thereof include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; conductive whiskers such as zinc oxide and potassium titanate; a conductive metal oxide such as titanium oxide; a conductive polymer such as a polyphenylene derivative, or the like, and any one or a mixture of two or more selected therefrom may be used as the first conductive material. The first conductive material may be included at 1 wt % to 30 wt % with respect to the total weight of the negative electrode active material layer.

The first negative electrode active material layer may further include a thickening agent.

The thickening agent may be a cellulose-based compound. Specifically, the cellulose-based compound may include carboxymethyl cellulose (CMC), carboxyethyl cellulose, methyl cellulose, ethyl cellulose, hydroxylethyl cellulose, hydroxypropyl cellulose, CMC sodium (CMCNa), or the like, and any one or a mixture of two or more selected therefrom may be used as the thickening agent. More specifically, the first cellulose-based compound may be CMC or CMCNa.

The thickening agent may be included at 1 wt % or 10 wt % with respect to the total weight of the first negative electrode active material layer.

In the first negative electrode active material layer having the above constitution, a ratio of a thickness of the first negative electrode active material layer with respect to a total thickness of the first and second negative electrode active material layers may be less than 0.5. When the thickness ratio of the first negative electrode active material layer is 0.5 or higher, there is a concern about deterioration of adhesion between the negative electrode current collector and the active material due to migration of the styrene-butadiene-based rubber of the first negative electrode active material layer. In consideration of a decrease in migration of the styrene-butadiene-based rubber and the remarkableness of the effect of improving the adhesion between the negative electrode current collector and the active material as a result, the ratio of the thickness of the first negative electrode active material layer to the total thickness of the first and second negative electrode active material layers may be, more specifically, 0.1 to 0.3, and even more specifically, 0.1 to 0.2.

Under a condition in which the above thickness ratio range is satisfied, an average thickness of the first negative electrode active material layer may be 10 μm to 1,000 μm. When the first negative electrode active material layer has a thickness in the above range, migration of the styrene-butadiene-based rubber of the first negative electrode active material layer may be reduced, and adhesion between the negative electrode current collector and the active material and the performance of a secondary battery may be simultaneously improved by the use of a small amount of a binder. In consideration of a decrease in migration of the styrene-butadiene-based rubber and the remarkableness of the effect of improving adhesion between the negative electrode current collector and the active material as a result, the average thickness of the first negative electrode active material layer may be, more specifically, 20 μm to 500 μm.

In the negative electrode according to an embodiment of the present invention, the (meth)acrylate-based polymer included in the second negative electrode active material layer is a second binder and may assist in bonding between an active material, a conductive material, and the like and cohesion between active materials, and particularly, may solve a problem in which resistance is increased due to use of the butadiene-based rubber included in the first negative electrode active material layer, thereby decreasing resistance in the electrode.

Specifically, the (meth)acrylate-based polymer may include a repeating unit of a (meth)acrylic acid ester-derived structure and a repeating unit of a styrene-derived structure, and a content of the repeating unit of the (meth)acrylic acid ester-derived structure in the (meth)acrylate-based polymer may be 60 wt % to 90 wt % with respect to the total weight of the (meth)acrylate-based polymer. When the content of the repeating unit of the (meth)acrylic acid ester-derived structure is less than 60 wt %, the effect of decreasing resistance in the electrode is insignificant, and when the content of the repeating unit of the (meth)acrylic acid ester-derived structure exceeds 90%, there is a concern about deterioration in cohesion between active materials. In consideration of the remarkableness of the effect of decreasing resistance in the electrode and improving cohesion between active materials in accordance with the inclusion of the repeating unit of the (meth)acrylic acid ester-derived structure, the repeating unit of the (meth)acrylic acid ester-derived structure may be included at 70 wt % to 90 wt % with respect to the total weight of the (meth)acrylate-based polymer.

In the (meth)acrylate-based polymer, monomers that provide the repeating unit of the (meth)acrylic acid ester-derived structure and the repeating unit of the styrene-derived structure are the same as that described above.

In addition to the above-described repeating unit of the (meth)acrylic acid ester-derived structure and the repeating unit of the styrene-derived structure, the (meth)acrylate-based polymer may further include a repeating unit of a butadiene-derived structure to improve an adhesion characteristic.

Specifically, the repeating unit of the butadiene-derived structure is the same as that described above and may be included in an amount of 20 wt % or less, more specifically, 10 wt % or less, with respect to the total weight of the (meth)acrylate-based polymer. In this way, when the (meth)acrylate-based polymer in the second negative electrode active material layer further includes the repeating unit of the butadiene-derived structure, cohesion between active materials in the second negative electrode active material layer may be further improved due to an excellent adhesion characteristic of butadiene itself. However, when the content of the repeating unit of the butadiene-derived structure included in the (meth)acrylate-based polymer exceeds 20 wt %, a content of the repeating unit of the (meth)acrylic acid ester-derived structure that provides an excellent effect of decreasing resistance is relatively decreased, and there is a concern about an increase in resistance in the second negative electrode active material layer.

The (meth)acrylate-based polymer having the above constitution may also be used in the form of a particle. Specifically, the (meth)acrylate-based polymer may have an average particle size ($D_{50}$) that is 0.001 to 0.2 times the average particle size ($D_{50}$) of the second negative electrode active material. When the average particle size of the (meth)acrylate-based polymer is less than 0.001 times the average particle size of the second negative electrode active material, there is a concern that the (meth)acrylate-based polymer in the form of a fine particle may surround a surface of the second negative electrode active material and interfere with contact between the active material and the electrolyte, and when the average particle size of the (meth)acrylate-based polymer exceeds 0.2 times the average particle size of the second negative electrode active material, a point contact ratio with the active material is decreased, and it is difficult to provide excellent adhesion. More specifically, the (meth)acrylate-based polymer may have an average particle size ($D_{50}$) of 50 nm to 800 nm. When the average particle size ($D_{50}$) of the (meth)acrylate-based polymer exceeds the above range, a problem may occur in terms of a process and adhesion due to a large particle size, and when the average particle size ($D_{50}$) of the (meth)acrylate-based polymer is less than the above range, dispersibility is deteriorated due to condensation between fine particles, uniform dispersion of the particles in the second negative electrode active material layer may be difficult, and there is a concern about deterioration of the adhesion characteristic. More specifically, the average particle size ($D_{50}$) of the (meth)acrylate-based polymer may be 50 nm to 700 nm, and more specifically, 90 nm to 600 nm.

The (meth)acrylate-based polymer in the second negative electrode active material layer may be included in an amount of 1 wt % to 20 wt % with respect to a total weight of the second negative electrode active material layer. By the (meth)acrylate-based polymer being included in the second negative electrode active material layer at an amount in the above range, an impregnation ability with respect to an electrolyte may be excellent, and electrical conductivity, energy density, and the like in the second negative electrode active material layer may be improved due to an excellent binding force between active materials in the second negative electrode active material layer. In consideration of the remarkableness of the effect of improving the binding force and improving electrical conductivity and energy density in the negative electrode in accordance with the inclusion of the (meth)acrylate-based polymer in the second negative electrode active material layer, the (meth)acrylate-based polymer may be included in an amount of, more specifically, 1 wt % to 10 wt %, and even more specifically, 1 wt % to 7 wt %, with respect to the total weight of the second negative electrode active material layer.

The second negative electrode active material layer having the above constitution may have an average thickness whose ratio with respect to the average thickness of the first negative electrode active material layer exceeds 1, and in consideration of the remarkableness of an improvement effect caused by optimization of required characteristics of a binder in accordance with a thickness in the negative electrode, a thickness ratio of the first negative electrode active material layer and the second negative electrode active material layer may be, more specifically, 1 to 3:5 to 9.

Under a condition in which the above thickness ratio range is satisfied, the average thickness of the second negative electrode active material layer may be, specifically 10 μm to 1000 μm, more specifically, 20 μm to 500 μm, and even more specifically, 30 μm to 300 μm.

In addition to the above-described (meth)acrylate-based polymer, the second negative electrode active material layer may further include the second negative electrode active material that is generally included in a negative electrode active material layer and, selectively, at least one of the second conductive material and a thickening agent. The second negative electrode active material, the second conductive material, and the thickening agent may be the same as those described above in the description of the first negative electrode active material layer, and components included in the first and second negative electrode active material layers may be the same as each other, or different components may be selected therefor and used. Among the components, the first and second negative electrode active material layers may include a graphite material such as natural graphite having relatively high resistance.

More specifically, in the negative electrode according to an embodiment of the present invention, the ratio of the thickness of the first negative electrode active material layer to the total thickness of the first and second negative electrode active material layers may be 0.1 to 0.3, or the ratio of the thickness of the first negative electrode active material layer to the thickness of the second negative electrode active material layer may be 1 to 3:5 to 9. In the negative electrode, the first negative electrode active material layer may include a carbon-based negative electrode active material; and the styrene-butadiene-based rubber including a repeating unit of styrene-derived structure, a repeating unit of a butadiene-derived structure, and a repeating unit of a (meth)acrylic acid ester-derived structure, wherein a total content of the repeating unit of the styrene-derived structure and the repeat of the butadiene-derived structure is 50 wt % or higher, and the second negative electrode active material layer may include the (meth)acrylate-based polymer including a repeating unit of a styrene-derive structure, a repeating unit of a butadiene-derived structure, and a repeating unit of a (meth)acrylic acid ester-derived structure, wherein a content of the repeating unit of the (meth)acrylic acid ester-derived structure is 60 wt % to 80 wt %.

In the above-described negative electrode according to an embodiment of the present invention, a total loading amount of the first and second negative electrode active materials included in the first negative electrode active material layer and the second negative electrode active material layer may be 50 mg/25 cm$^2$ to 1,000 mg/25 cm$^2$, and more specifically, 50 mg/25 cm$^2$ to 500 mg/25 cm$^2$.

By including the styrene-butadiene-based rubber and the (meth)acrylate-based polymer as binders in the form of a particle with the use of the first and second negative electrode active materials in the form of a particle, the negative electrode may form fine pores in each of the active material layers. Specifically, the negative electrode may have porosity of 10 vol % to 50 vol %, more specifically, 20 vol % to 40 vol %, with respect to a total volume of the first and second negative electrode active material layers.

In the present invention, the porosity may be measured by a Brunauer-Emmett-Teller (BET) measurement method or mercury (Hg) porosimetry.

The negative electrode according to an embodiment of the present invention having the above-described constitution may be fabricated by a fabrication method including a step of forming a first negative electrode active material layer including a first negative electrode active material and a styrene-butadiene-based rubber on a negative electrode current collector (Step 1); and a step of forming a second negative electrode active material layer including a second negative electrode active material and a (meth)acrylate-based polymer on the first negative electrode active material layer (Step 2).

In the fabrication method, Step 1 is a step of forming the first negative electrode active material layer on the negative electrode current collector.

Except for the use of the above-described styrene-butadiene-based rubber as a binder, the first negative electrode active material layer may be fabricated in accordance with a common method of fabricating a negative electrode active material layer. Specifically, the first negative electrode active material layer may be fabricated by applying a composition for forming the first negative electrode active material layer, which is fabricated by dissolving or dispersing the first negative electrode active material and the styrene-butadiene-based rubber, and selectively, at least one of the first conductive material and the thickening agent in a solvent, on the negative electrode current collector and drying; or by applying the composition for forming the first negative electrode active material layer on a separate support body and then laminating a film of the composition for forming the first negative electrode active material layer obtained by separation from the support body on the negative electrode current collector.

Here, the types and contents of the negative electrode active material, the styrene-butadiene-based rubber, the first conductive material, and the thickening agent that are usable during the fabrication of the composition for forming the negative electrode active material layer are the same as those described above in the description of the first negative electrode active material layer.

A solvent that is usable during the fabrication of the composition for forming the negative electrode active material layer may be a solvent that is generally used in the art, and the solvent may be removed in a drying process. Specifically, examples of the solvent may include dimethyl sulfoxide (DMSO), isopropyl alcohol, N-methyl pyrrolidone (NMP), acetone, or water, and one or a mixture of two or more selected therefrom may be used as the solvent. A use amount of the solvent is sufficient as long as the solvent has a viscosity capable of allowing the negative electrode active material, the conductive material, and the binder to be dissolved or dispersed and exhibiting excellent thickness uniformity when applied later for fabricating the first negative electrode active material layer in consideration of an application thickness and a fabrication yield of the composition for forming the negative electrode active material layer.

The composition for forming the first negative electrode active material layer may further include one or more types of an additive such as a dispersant for improving dispersibility of composition-forming materials.

An aqueous dispersant that is commonly used in the art or an organic dispersant such as NMP may be used as the dispersant.

Any one selected from the group consisting of a copper foil, a nickel foil, a stainless steel foil, a titanium foil, a nickel foam, a copper foam, a polymer base material coated with a conductive metal, and a combination thereof may be used as the negative electrode current collector, and among the above, the copper foil or copper foam may be used.

The process of coating the composition for forming the first negative electrode active material layer on the negative electrode current collector may be performed in accordance with a common method, and specifically, may be performed by a method such as bar coating, casting, spraying, or the like.

The process of drying after applying the composition for forming the first negative electrode active material layer is a process for removing a solvent included in the composition and may be performed in accordance with a common drying method such as hot-air drying, natural drying, and heating.

Next, Step 2 is a step of forming the second negative electrode active material layer including the (meth)acrylate-based polymer on the first negative electrode active material layer formed in Step 1 above.

Except for the use of the above-described (meth)acrylate-based polymer as a binder, the second negative electrode active material layer may be fabricated in accordance with a common method of fabricating a negative electrode active material layer. Specifically, the second negative electrode active material layer may be fabricated by applying a composition for forming the second negative electrode active material layer, which is fabricated by dissolving or dispersing the second negative electrode active material and the binder, and selectively, at least one of the conductive material and the thickening agent in a solvent, on the first negative electrode active material layer and drying; or by casting the composition for forming the second negative electrode active material layer on a separate support body and then laminating a film obtained by separation from the support body on the first negative electrode active material layer.

Here, the second negative electrode active material, the (meth)acrylate-based polymer, the second conductive material, the thickening agent, and the solvent are the same as those described above.

According to the method of fabricating the negative electrode according to an embodiment of the present invention, by the first negative electrode active material layer including the butadiene-based rubber with excellent adhesion being located on the negative electrode current collector, excellent adhesion between the negative electrode active current collector and the active material may be secured first. Also, by the second negative electrode active material layer including the (meth)acrylate-based polymer with an excellent resistance characteristic being located on the negative electrode current collector and the first negative electrode active material layer having excellent adhesion, resistance in the electrode may be decreased.

According to the method of fabricating the negative electrode according to an embodiment of the present invention, a use amount of a styrene-butadiene-based rubber binder may be reduced to a maximum of 50 wt %, and more specifically, 30 wt % to 50 wt % in comparison to a content of a binder that is conventionally used during fabrication of a negative electrode.

According to still another embodiment of the present invention, an electrochemical device including the negative electrode is provided. Specifically, the electrochemical device may be a battery, a capacitor, and the like, and more specifically, may be a lithium secondary battery.

Specifically, the lithium secondary battery includes a positive electrode, a negative electrode disposed opposite the positive electrode, a separator interposed between the positive electrode and the negative electrode, and an electrolyte, and the negative electrode is the same as that described above. Also, the lithium secondary battery may selectively further include a battery container configured to store an electrode assembly including the positive electrode, the negative electrode, and the separator, and a sealing member configured to seal the battery container.

In the lithium secondary battery, the positive electrode includes a positive electrode current collector and a positive electrode active material layer located on the positive electrode current collector, and the positive electrode may be fabricated by mixing a positive electrode active material, a conductive material, a binder, and a solvent to fabricate a slurry and then directly coating a metal current collector with the slurry or by casting the slurry on a separate support body and laminating a positive electrode active material film separated from the support body on the metal current collector.

The positive electrode current collector is not particularly limited as long as the positive electrode current collector does not cause a chemical change to a battery and has conductivity, and for example, stainless steel, aluminum, nickel, titanium, sintered carbon, or an aluminum or stainless steel whose surface is treated with carbon, nickel, titanium, silver, and the like may be used as the positive electrode current collector. The positive electrode current collector may have a thickness of 3 µm to 500 µm, and, adhesion of the positive electrode active material may be improved by forming fine irregularities on a surface of the current collector. For example, the positive electrode current collector may be used in various forms such as a film, a sheet, a foil, a net, a porous body, a foam body, and a nonwoven fabric body.

In addition to the above-described positive electrode active material, the positive electrode active material layer may include a conductive material and a binder.

Examples of the positive electrode active material may include a layered compound such as lithium cobalt oxide ($LiCoO_2$), lithium nickel oxide ($LiNiO_2$), $Li[Ni_xCo_yMn_zM_v]O_2$ (in this formula, M is any one or two or more elements selected from the group consisting of Al, Ga, and In; and $0.3 \leq x < 1.0$, $0 \leq y$, $z \leq 0.5$, $0 \leq v \leq 0.1$, $x+y+z+v=1$), $Li(Li_aM_{b-a-b}M'_{b'})O_{2-c}A_c$ (in this formula, $0 \leq a \leq 0.2$, $0.6 \leq b \leq 1$, $0 \leq b' \leq 0.2$, $0 \leq c \leq 0.2$; M comprises any one or more selected from the group consisting of Mn, Ni, Co, Fe, Cr, V, Cu, Zn, and Ti; M' is any one or more selected from the group consisting of Al, Mg, and B, and A is any one or more selected from the group consisting of P, F, S, and N.) or a compound substituted with one or more transition metals; a lithium-manganese oxide such as $Li_{1+y}Mn_{2-y}O_4$ (here, y is 0 to 0.33), $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; an Ni site type lithium nickel oxide represented by the chemical formula, $LiNi_{1-y}M_yO_2$ (here, M is Co, Mn, Al, Cu, Fe, Mg, B, or Ga, and y is 0.01 to 0.3); a lithium manganese composite oxide represented by the chemical formula $LiMn_{2-y}M_yO_2$ (here, M is Co, Ni, Fe, Cr, Zn, or Ta, and y is 0.01 to 0.1) or $Li_2Mn_3MO_8$ (here, M is Fe, Co, Ni, Cu, or Zn); $LiMn_2O_4$ in which some of Li in the chemical formula is substituted with alkaline earth metal ions; a disulfide compound; $Fe_2(MoO_4)_3$ and the like, but the positive electrode active material is not limited thereto.

In the lithium secondary battery, the separator separates the negative electrode and the positive electrode and provides a migration path for lithium ions, and anything that is generally used as a separator in a lithium secondary battery may be used without particular limitation. Particularly, it is preferable that the separator have low resistance with respect to ion migration in an electrolyte and have an excellent ability of impregnating an electrolyte. Specifically, a porous polymer film, for example, a porous polymer film fabricated with a polyolefin-based polymer such as an ethylene homopolymer, a propylene homopolymer, an ethylene-butene copolymer, an ethylene-hexene copolymer, and an ethylene-methacrylate copolymer or a stacked structure of two or more layers thereof may be used. Also, a general porous nonwoven fabric, for example, a nonwoven fabric formed of high-melting-point glass fiber, polyethylene terephthalate fiber, or the like may be used. A coated separator including a ceramic component or a polymer material for securing heat resistance or mechanical strength may be used, and may be selectively used in a single-layer or multi-layer structure.

Examples of an electrolyte used in the present invention may include an organic liquid electrolyte, an inorganic liquid electrolyte, a solid polymer electrolyte, a gel-type polymer electrolyte, an inorganic solid electrolyte, and a molten-type inorganic electrolyte usable during the fabrication of a lithium secondary battery but are not limited thereto.

Specifically, the electrolyte may include an organic solvent and a lithium salt.

In the electrolyte used in an embodiment of the present invention, anything that is generally used in an electrolyte for a secondary battery may be used without limitation as a lithium salt that may be included in the electrolyte, and for example, any one selected from the group consisting of $F^-$, $C^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as anions of the lithium salt.

In the electrolyte used in an embodiment of the present invention, anything that is generally used may be used without limitation as the organic solvent included in the electrolyte, and typically, any one or a mixture of two or more selected from the group consisting of propylene carbonate, ethylene carbonate, diethyl carbonate, dimethyl carbonate, ethyl methyl carbonate, methyl propyl carbonate, dipropyl carbonate, fluoro-ethylene carbonate, dimethyl sulfoxide, acetonitrile, dimethoxyethane, diethoxyethane, vinylene carbonate, sulfolane, gamma-butyrolactone, propylene sulfite, tetrahydrofuran, methyl formate, methyl acetate, ethyl acetate, isopropyl acetate, isoamyl acetate, methyl propionate, ethyl propionate, propyl propionate, butyl propionate, methyl butylate, and ethyl butylate may be used as the organic solvent.

Particularly, among the carbonate-based organic solvents, ethylene carbonate and propylene carbonate, which are cyclic carbonates are high-viscosity organic solvents and may be preferably used due to having a high dielectric constant and thus being capable of dissociating a lithium salt in an electrolyte well. The cyclic carbonates may be more preferably used because an electrolyte having high electrical conductivity may be formed when a linear carbonate with low viscosity and a low dielectric constant such as dimethyl carbonate and diethyl carbonate is mixed with the cyclic carbonates at a proper ratio and used.

Selectively, the electrolyte stored according to the present invention may further include an additive such as an overcharge preventing agent generally included in the electrolyte.

A secondary battery is completely formed when a separator is placed between a positive electrode and a negative electrode to form an electrode assembly, the electrode assembly is put in a cylindrical battery case, angular prismatic battery case, or an aluminum pouch, and then an electrolyte is injected thereinto. A lithium secondary battery is completely formed when the electrode assembly is stacked and then impregnated with the electrolyte, and a product obtained as a result is put in the battery case and sealed.

The lithium secondary battery according to the present invention may be preferably used as a unit cell in a medium-and-large-sized battery module including a plurality of battery cells as well as being used as a battery cell that is used as a power source of a small-sized device. Preferable examples of the medium-and-large-sized device include an electric vehicle, a hybrid electric vehicle, a plug-in hybrid electric vehicle, and a power storage system, but the medium-and-large-sized device is not limited thereto.

MODE

Hereinafter, an embodiment of the present invention will be described in detail so that one of ordinary skill in the art to which the present invention pertains can easily practice the present invention. However, the present invention may be implemented in various other forms and is not limited to the embodiment described herein.

Example 1

Fabrication of Negative Electrode

<Step 1: Fabrication of First Negative Electrode Active Material Layer]

Artificial graphite (average particle size ($D_{50}$)=19 μm) and spherical natural graphite (average particle size ($D_{50}$)=11 μm) were uniformly mixed in a weight ratio of 1:1 as a first negative electrode active material. Then, the first negative electrode active material, carbon black as a first conductive material, a styrene-butadiene-based rubber (SBR) (a ratio of a content of a repeating unit of a styrene-derived structure to a repeating unit of a butadiene-derived structure=1:1 (weight ratio), a ratio of a total content of the repeating unit of the styrene-derived structure and the repeating unit of the butadiene-derived structure in the styrene-butadiene-based rubber:a content of a repeating unit of an acrylate-derived structure=94:6 (weight ratio), average particle size=160 nm), and carboxymethyl cellulose (CMC) as a thickening agent were mixed in a weight ratio of 96:1:2:1, and then the mixture was mixed with water ($H_2O$), which is a first solvent, to produce a uniform composition for forming a first negative electrode active material layer.

One surface of a copper foil current collector was coated with the produced composition for forming the first negative electrode active material layer and then dried so that an average thickness thereof after drying was 20 μm, thereby obtaining the first negative electrode active material layer (loading amount of first negative electrode active material=50 mg/25 $cm^2$).

<Step 2: Fabrication of Second Negative Electrode Active Material Layer>

Artificial graphite (average particle size ($D_{50}$)=19 μm) and spherical natural graphite (average particle size ($D_{50}$)=11 μm) were uniformly mixed in a weight ratio of 1:1 as a second negative electrode active material. Then, the second negative electrode active material, carbon black as a second conductive material, a (meth)acrylate-based polymer (a ratio of a content of a repeating unit of an acrylate-derived structure:a total content of a repeating unit of a styrene-derived structure and a repeating unit of a butadiene-derived structure=70:30 (weight ratio), average particle size=400 nm), and CMC as a thickening agent were mixed in a weight ratio of 96:1:2:1, and then the mixture was mixed with water ($H_2O$), which is a second solvent, to produce a uniform composition for forming a second negative electrode active material layer.

The produced composition for forming the second negative electrode active material layer was applied on the first negative electrode active material layer and then dried so that an average thickness thereof after drying was 100 μm, thereby obtaining the second negative electrode active material layer (loading amount of second negative electrode active material=200 mg/25 $cm^2$, porosity of negative electrode=28 vol % with respect to a total volume of the first and second negative electrode active material layers).

Fabrication of Lithium Secondary Battery $LiCoO_2$ was used as a positive electrode active material, and $LiCoO_2$, carbon black as a conductive material, and SBR as a binder were mixed in a weight ratio of 94:3.5:2.5, and then the mixture was added to N-methyl-2-pyrrolidone (NMP) to fabricate a positive electrode active material slurry. One surface of an aluminum foil was coated with the fabricated slurry, dried, rolled, and then punched in a predetermined size to fabricate a positive electrode.

A polyolefin separator was interposed between the positive electrode and the previously fabricated negative electrode, and then an electrolyte in which 1 M $LiPF_6$ was dissolved was injected into a solvent in which ethylene carbonate (EC) and diethyl carbonate (DEC) were mixed at a volume ratio of 30:70, thereby fabricating a coin type lithium secondary battery.

Examples 2 and 3

Except for the use of materials listed in Table 1 below at contents indicated therein, a negative electrode and a lithium secondary battery were fabricated with the same method as in Example 1 above.

Comparative Example 1

Except for not performing Step 2 of Example 1 above when fabricating a negative electrode and the use of a negative electrode including a single negative electrode active material layer in which only the first negative electrode active material layer of Example 1 is formed at a thickness of 120 μm on a copper current collector, a lithium secondary battery was fabricated with the same method as in Example 1 (loading amount of negative electrode active material=250 mg/25 $cm^2$, porosity of negative electrode=28 vol % with respect to a total volume of the negative electrode active material layer).

Comparative Example 2

Except for not performing Step 1 of Example 1 above when fabricating a negative electrode and the use of a negative electrode obtained by applying a composition for forming a negative electrode active material layer including the (meth)acrylate-based polymer, which is the same as that in Step 2 of Example 1, on a copper current collector at a thickness of 120 μm and drying, a lithium secondary battery was fabricated with the same method as in Example 1 (loading amount of negative electrode active material=250 mg/25 $cm^2$, porosity of negative electrode=28 vol % with respect to a total volume of the negative electrode active material layer).

Comparative Example 3

Except for the use of materials listed in Table 1 below at contents indicated therein, a negative electrode and a lithium secondary battery were fabricated with the same method as in Example 1 above.

Experiment Example 1: Measurement of Adhesion and Resistance

Changes in adhesion and resistance of a negative electrode were measured in accordance with types of binders with respect to the negative electrode fabricated in each of Examples 1 to 3 and Comparative Examples 1 to 3.

Specifically, the negative electrode fabricated in each of Examples 1 to 3 and Comparative Examples 1 to 3 were blanked top and back and at left/middle/right points in the same lane by using an electrode blanking device (15 cm×1 cm), and each of the blanked negative electrodes was brought in contact with a slide glass to which a double-sided tape was adhered, thereby fabricating a sample for each of the negative electrodes. Next, a surface of each of the electrodes was made to be evenly adhered to the double-sided tape by rubbing each of the fabricated samples 15 times using a roller at a load of 2 kg. Then, each of the fabricated samples was mounted on a grip of a universal testing machine (UTM) (LF Plus, Lloyd Instruments) as an electrode adhesion testing machine, and then adhesion was measured by applying a load cell of 5N (1 lbf).

An effect of decreasing resistance at room temperature (25° C.) was evaluated with respect to a lithium secondary battery fabricated in each of Examples 1 to 3 and Comparative Examples 1 to 3 above.

Specifically, after performing charging/discharging with respect to the lithium secondary battery at a 0.2 C/0.2 C condition in an operating voltage range of 3.0 V to 4.2 V at room temperature (25° C.), the battery charged/discharged at room temperature (25° C.) was discharged at 2.5 C at a depth of charge (SOC 50) to measure resistance.

TABLE 1

| Example | | Ratio of monomer (repeating units of derived structure) (%) | | Adhesion between negative electrode current collector and active material (kgf/10 mm) | Cohesion between active materials (kgf/10 mm) | Resistance at 2.5 C (mohm) |
|---|---|---|---|---|---|---|
| | | Styrene-butadiene (weight ratio of styrene:butadiene) | Acrylate | | | |
| Example 1 (Double layer) | First negative electrode active material layer | 94 (50:50) | 6 | 34.8 | 82.6 | 1.452 |

TABLE 1-continued

| Example | | Ratio of monomer (repeating units of derived structure) (%) Styrene-butadiene (weight ratio of styrene:butadiene) | Acrylate | Adhesion between negative electrode current collector and active material (kgf/10 mm) | Cohesion between active materials (kgf/10 mm) | Resistance at 2.5 C (mohm) |
|---|---|---|---|---|---|---|
| | Second negative electrode active material layer | 30 (50:50) | 70 | | | |
| Example 2 (Double layer) | First negative electrode active material layer | 86 | 14 | 35.6 | 79.5 | 1.482 |
| | Second negative electrode active material layer | 39 | 61 | | | |
| Example 3 (Double layer) | First negative electrode active material layer | 72 | 28 | 30.9 | 79.2 | 1.466 |
| | Second negative electrode active material layer | 39 | 61 | | | |
| Comparative Example 1 (Single layer) | Negative electrode active material layer | 94 (50:50) | 6 | 27.2 | 93.3 | 1.555 |
| Comparative Example 2 (Single layer) | Negative electrode active material layer | 30 (50:50) | 70 | 16.5 | 72.1 | 1.460 |
| Comparative Example 3 (Double layer) | First negative electrode active material layer | 40 (50:50) | 60 | 18.2 | 70.6 | 1.458 |
| | Second negative electrode active material layer | 30 (50:50) | 70 | | | |

Experiment Example 2: Evaluation of Battery Characteristics of Lithium Secondary Battery A lifespan characteristic was evaluated using the following method with respect to the lithium secondary battery fabricated in each of Examples 1 to 3 and Comparative Examples 1 to 3 above.

Specifically, charge/discharge was performed for 500 times under a 0.5 C/0.5 C condition within an operating voltage range of 3.0 V to 4.2 V at a temperature of 25° C. with respect to the lithium secondary battery fabricated in each of Examples 1 to 3 and Comparative Examples 1 to 3.

As a result thereof, a cycle capacity retention rate, which is a ratio of a discharge capacity at the $500^{th}$ cycle to an initial capacity after charge/discharge is performed 500 times at 25° C. was measured and is shown in Table 2 below.

TABLE 2

| | $500^{th}$ cycle capacity retention rate(%) at room temperature (25° C.) |
|---|---|
| Example 1 | 88.2 |
| Example 2 | 87.3 |
| Example 3 | 87.6 |
| Comparative Example 1 | 75.2 |
| Comparative Example 2 | 71.2 |
| Comparative Example 3 | 83.6 |

As a result of the experiment, the lithium secondary battery including each of the negative electrodes fabricated in Examples 1 to 3 exhibited a significantly improved lifespan characteristic in comparison to Comparative Examples 1 to 3.

This is because, in the case of Examples 1 to 3, two types of binders having optimized characteristics were used such that adhesion between the negative electrode current collector and the active material and cohesion between active materials were increased, and a binder having low resistance was used as the second negative electrode active material layer such that resistance in the electrode was decreased, thereby improving the lifespan characteristic of the battery.

The invention claimed is:

1. A negative electrode for a secondary battery, the negative electrode comprising:
    a negative electrode current collector;
    a first negative electrode active material layer located on the negative electrode current collector; and
    a second negative electrode active material layer located on the first negative electrode active material layer, wherein:
    a ratio of a thickness of the first negative electrode active material layer to a total thickness of the first and second negative electrode active material layers is less than 0.5;
    the first negative electrode active material layer includes a styrene-butadiene-based rubber in which a total content of a repeating unit of a styrene-derived structure and a repeating unit of a butadiene-derived structure is 50 wt % or higher; and
    the second negative electrode active material layer includes a (meth)acrylate-based polymer including a repeating unit of a styrene-derived structure and a repeating unit of a (meth)acrylic acid ester-derived structure, the repeating unit of the (meth)acrylic acid ester-derived structure being included in an amount of 60 wt % to 90 wt %.

2. The negative electrode of claim 1, wherein the styrene-butadiene-based rubber includes the repeating unit of the styrene-derived structure and the repeating unit of the butadiene-derived structure in a weight ratio of 1:1 to 3:1.

3. The negative electrode of claim 1, wherein the styrene-butadiene-based rubber has an average particle size of 50 nm to 800 nm.

4. The negative electrode of claim 1, wherein the styrene-butadiene-based rubber further includes a repeating unit of a (meth)acrylic acid ester-derived structure at 30 wt % or lower with respect to a total weight of the styrene-butadiene-based rubber.

5. The negative electrode of claim 1, wherein the styrene-butadiene-based rubber is included in an amount of 1 wt % to 20 wt % with respect to a total weight of the first negative electrode active material layer.

6. The negative electrode of claim 1, wherein the (meth)acrylate-based polymer has an average particle size of 50 nm to 800 nm.

7. The negative electrode of claim 1, wherein the (meth)acrylate-based polymer further includes a repeating unit of a butadiene-derived structure at 20 wt % or lower with respect to a total weight of the (meth)acrylate-based polymer.

8. The negative electrode of claim 1, wherein the (meth)acrylate-based polymer is included in an amount of 1 wt % to 20 wt % with respect to a total weight of the second negative electrode active material layer.

9. The negative electrode of claim 1, wherein a thickness ratio of the first negative electrode active material layer and the second negative electrode active material layer is 1 to 3:5 to 9.

10. The negative electrode of claim 1, wherein the first negative electrode active material layer and the second negative electrode active material layer independently include a graphite-based negative electrode active material.

11. The negative electrode of claim 1, wherein the negative electrode has porosity of 10 vol % to 50 vol % with respect to a total volume of the first and second negative electrode active material layers.

12. A method of fabricating the negative electrode for a secondary battery of claim 1, the method comprising:
    a step of forming a first negative electrode active material layer including a first negative electrode active material and a styrene-butadiene-based rubber on a negative electrode current collector; and
    a step of forming a second negative electrode active material layer including a second negative electrode active material and a (meth)acrylate-based polymer on the first negative electrode active material layer, wherein:
    a ratio of a thickness of the first negative electrode active material layer to a total thickness of the first and second negative electrode active material layers is less than 0.5;
    a total content of a repeating unit of a styrene-derived structure and a repeating unit of a butadiene-derived structure in the styrene-butadiene-based rubber is 50 wt % or higher with respect to a total weight of the styrene-butadiene based rubber; and
    the (meth)acrylate-based polymer includes a repeating unit of a styrene-derived structure and a repeating unit of a (meth)acrylic acid ester-derived structure, the repeating unit of the (meth)acrylic acid ester-derived structure being included in an amount of 60 wt % to 90 wt %.

13. A lithium secondary battery comprising the negative electrode of any one of claim 1.

* * * * *